United States Patent [19]
Pryor et al.

[11] 3,726,987
[45] Apr. 10, 1973

[54] GLASS OR CERAMIC-TO-METAL SEALS

[75] Inventors: Michael J. Pryor, Woodbridge; James M. Popplewell, Guilford, both of Conn.

[73] Assignee: Olin Corporation, New Haven, Conn.

[22] Filed: Feb. 17, 1972

[21] Appl. No.: 227,240

Related U.S. Application Data

[62] Division of Ser. No. 78,899, Oct. 7, 1970, Pat. No. 3,676,292.

[52] U.S. Cl. .......................... 174/50.61, 161/196
[51] Int. Cl. .......................................... H01j 5/00
[58] Field of Search ............... 174/50.61, 50.63, 174/50.56, 525; 161/196; 75/160

[56] References Cited

UNITED STATES PATENTS

| | | |
|---|---|---|
| 3,351,700 | 11/1967 | Savolainen et al. ............. 174/50.56 |
| 3,546,363 | 12/1970 | Pryor et al. ...................... 174/525 |
| 3,618,203 | 11/1971 | Pryor ........................... 174/50.56 X |

Primary Examiner—Bernard A. Gilheany
Attorney—Robert H. Bachman et al.

[57] ABSTRACT

Glass or ceramic-to-metal composites or seals wherein the glass or ceramic is bonded to a copper base alloy having a thin film of $Al_2O_3$ on its surface. The $Al_2O_3$ film comprises at least 10 percent, up to 100 percent, of the oxide film thickness on the metal. The copper base alloy preferably contains 2 to 10 percent aluminum with C.D.A. Alloy 638 being the most preferred alloy. The invention also includes the process of bonding the glasses or ceramics to the metal. Substantial mismatch between the coefficient of thermal expansion of the glasses or ceramics and the copper base alloys may be tolerated in accordance with this invention.

9 Claims, 4 Drawing Figures

PATENTED APR 10 1973   3,726,987

COPPER BASE ALLOY CONTAINING 2% TO 10% ALUMINUM

GLASS OR CERAMIC

GLASS OR CERAMIC-TO-METAL SEALS

This is a division, of application Ser. No. 78,899, filed Oct. 7, 1970, now U.S. Pat. No. 3,676,292.

There are many metal-glass-ceramic applications and systems which have in common the bonding of a glass or ceramic material to the surface of a metal. One common application is for making hermetic seals for metal cased semi-conductor devices. Characteristically, in the known glass or ceramic-to-metal seals, the oxide on the metal acts as the bonding agent in that it is bonded to the underlying metal and the glass or ceramic material. Therefore, the characteristics of the metal oxide exert a profound influence upon the overall properties of the glass or ceramic-to-metal bond.

Most metal oxides and mixtures of metal oxides which have been developed upon the surface of most metals and alloys, in accordance with the prior art, possess poor mechanical properties. Therefore, the prior art glass or ceramic-to-metal composites and seals, have been designed to minimize the stresses developed at the bond interface because of its relatively poor strength. It is generally known that those glasses and ceramics which possess the desirable bonding and sealing characteristics also have coefficients of thermal expansion which are substantially smaller than the coefficients of thermal expansion of most metals and alloys. Therefore, the prior art has developed a series of low expansivity metal alloys, which have coefficients of thermal expansion for a limited temperature range which reasonably closely match the coefficients of thermal expansion of many sealing glasses or ceramics as set forth in Table I.

it. The $Al_2O_3$ film comprises at least 10 percent of the total oxide film thickness. When a glass or ceramic is bonded to this copper base alloy having the $Al_2O_3$ film, a strong bond results.

Because of the high bond strength between this copper base alloy and the glass or ceramic, it is possible to fabricate glass or ceramic-to-metal composites or seals with a high degree of mismatch of coefficient of thermal expansion between the glass or ceramic and the metal. Therefore, the glass or ceramic-to-metal composites or seals in accordance with this invention eliminate the necessity of using the costly nickel containing low expansivity alloys and, further, they may be fabricated without the oxidizing pretreatment usually employed with the low expansivity alloys of the prior art. There is also a marked improvement in electrical and thermal conductivity as compared to the low expansivity alloys.

It is accordingly an object of this invention to provide a glass or ceramic-to-metal composite or seal having improved bond strength between the glass or ceramic and the metal, and to provide a process of making same.

It is a further object of this invention to provide a glass or ceramic-to-metal composite or seal wherein the metal is a copper base alloy, which forms a thin film of $Al_2O_3$ on its surface.

It is a further object of this invention to provide a glass-to-metal seal assembly for encasing semi-conductor devices wherein the metal is a copper base alloy which forms a thin film of $Al_2O_3$ on its surface.

TABLE I

| Material | Composite | Thermal expansion coeff. in./in./° C. |
|---|---|---|
| Kovar ASTM No. F-15-68 (Rodar) | Fe+29% Ni+17% Co+0.45% Mn+0.10% Si+0.02% C | $41 \times 10^{-7}$ (at 20° C.). $60 \times 10^{-7}$ (at 100° C.). $118 \times 10^{-7}$ (at 500° C.). |
| Nickel | 100% Ni | $49 \times 10^{-7}$ (range 0-400° C.). |
| Niron 52 ASTM No. F-30-68 | 51% Ni, 49% Fe | $128 \times 10^{-7}$ (at 20° C.). $98 \times 10^{-7}$ (range 25-500° C.). |
| Niron 42 ASTM No. F-30-68 | 41% Ni, 59% Fe | $47 \times 10^{-7}$ (range 30-300° C.). |
| Niron 46 ASTM No. F-30-68 | 46% Ni, 54% Fe | $77 \times 10^{-7}$ (range 30-350° C.). |
| Dumet ASTM No. F-29-68 | 43% Ni, 57% Fe | $68 \times 10^{-7}$ (range 30-400° C.). |
| Sylvania No. 4 ASTM No. F-31-68 | 42% Ni, 6% Cr, 52% Fe | $89 \times 10^{-7}$ (range 30-350° C.). |
| Soda-lime-silica glass | 70% $SiO_2$, 11% CaO, 14% $Na_2O+Al_2O_3+MgO$ | $90 \times 10^{-7}$ (range 0-100° C.). |
| Porcelain (electrical granulation) | 40% Leucite ($K_2O$, $Al_2O_3$, $4SiO_2$), 30% Mullite ($3Al_2O_3$, $2SiO_2$), 30% $SiO_2$. | $60 \times 10^{-7}$ (range 0-1,000° C.). |
| Sealing glass type 101 ASTM No. F-79-67T | 56% $SiO_2$, 1.5% $Al_2O_3$, 4.0% $K_2O$, 29.0% PbO | $92 \times 10^{-7}$ (range 30-300° C.). |

Unfortunately, the range of low expansivity alloys which have been developed are not otherwise particularly desirable materials. In the first place, they are characteristically quite costly. Further, since almost all are nickel based alloys or contain large proportions of nickel, their thermal and electrical conductivity is very poor. The corrosion resistance of the majority of the low expansivity alloys is also relatively poor. It is known that to obtain good glass adherence particularly to the bare low expansivity alloys, they usually require pretreatment to form a relatively thick oxide film. Further, the oxides formed, e.g., iron oxides, nickel oxides, cobalt oxides and mixtures thereof are not very desirable from the point of view of their mechanical and other characteristics.

In accordance with this invention, it has been found that a copper base alloy within certain ranges of composition forms on its surface an oxide layer, one compound of which is $Al_2O_3$ in the form of a compact continuous film. The $Al_2O_3$ film forms immediately adjacent to the metal surface and is strongly adherent to Other objects and advantages will become apparent to those skilled in the art as a detailed discussion of particular embodiments proceeds with reference to the drawings which form a part hereof, in which.

In accordance with this invention, it has been found that copper base alloys with relatively higher thermal expansivities than the glasses or ceramics can be used in glass or ceramic-to-metal composites or seals provided that the copper base alloy has certain inherent oxidation characteristics. The characteristics required in the copper alloy are that it has formed on its surface an oxide, one component of which is $Al_2O_3$ in the form of a compact continuous film. This $Al_2O_3$ film must form immediately adjacent to the metal, be strongly adherent to it and comprise at least 10 percent and up to 100 percent of the total oxide film thickness. Suitable copper base alloys for use in the glass or ceramic-to-metal composites or seals of this invention contain from 2 to 12 percent aluminum. Preferably, they contain from 2 to 10 percent aluminum, 0.001 to 3 percent silicon and a grain refining element selected from the group consisting of iron up to 4.5 percent, chromium up to 1 percent, zirconium up to 0.5 percent, cobalt up to 1 percent, and mixtures of these grain refining elements. In particular, C.D.A. Alloy 638 containing 2.5 to 3.1 percent aluminum, 1.5 to 2.1 percent silicon and 0.25 to 0.55 percent cobalt is most useful in the glass or ceramic-to-metal composites or seals of this invention. Impurities may be present in amounts not adversely affecting the properties of the glass or ceramic-to-metal composites or seals of this invention. In particular, the impurities may include less than 1 percent zinc; less than 1 percent nickel; less than 1 percent manganese; less than 1 percent tin; less than 0.5 percent lead; less than 0.1 percent phosphorus; and less than 0.1% arsenic.

The alloys useful with this invention and especially Alloy 638 have excellent high temperature oxidation resistance due to the formation of the protective alumina film. When the metal is oxidized in air, the alumina film is overlain with a thin layer of copper oxides. Controlled oxidation in a wet reducing atmosphere prevents the formation of the copper oxides and induces a film to form which is substantially completely alumina. Alumina seals efficiently to most glasses and ceramics. Therefore, since the alumina film formed on the alloys used with this invention is tightly adherent to the alloys, an excellent glass or ceramic-to-metal bond is produced.

Figure 1:
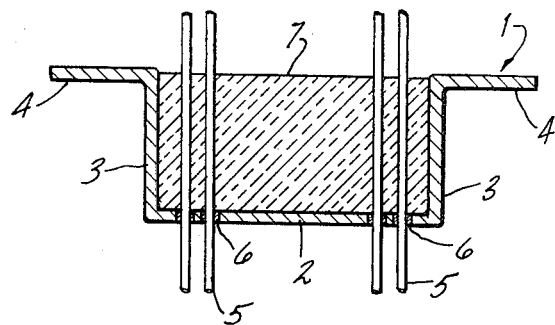
FIG. 1 is a cross sectional view of a glass or ceramic-to-metal seal in accordance with this invention.

A typical glass-to-metal seal according to the present invention is illustrated in FIG. 1. As seen therein, copper base alloys in accordance with this invention in the form of a sheet material have been drawn into a cup shaped header 1. The header 1 comprises a base portion 2 integrally connected to one end of a wall portion 3 and a flange portion 4 integrally connected to the other end of the wall portion 3. The header may be of any desired shape with the wall portion 3 being circular, rectangular or any other shape as required by the specific application.

Figure 2:
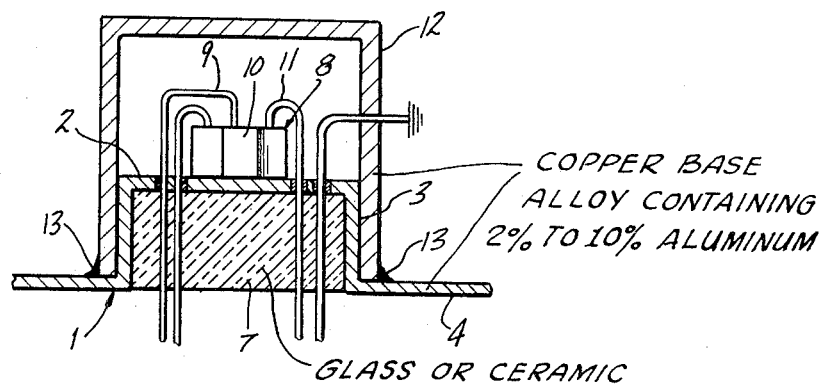
FIG. 2 is a cross sectional view of a glass or ceramic-to-metal seal assembly in accordance with this invention.

The wires 5 which may be made of the alloys in accordance with this invention pass through apertures 6 in the base portion 2 of the header 1. After these wires 5 have been placed through the apertures 6, a glass or ceramic in powder form is placed into the header, melted, and then allowed to solidify. By virtue of the sealing properties of the copper base alloys used with this invention, a strong bond is obtained between the glass or ceramic 7 and the header 1 and the wires 5. The glass or ceramic-to-metal seal which formed effectively insulates the wires 5 from the header 1 and further is hermetic so that moisture will not enter a completed package. The completed package is shown in FIG. 2. As shown therein, the header 1 of FIG. 1 has been inverted. A semi-conductor device 8, for example, a silicon transistor having an emitter region 9, a base region 10, and a collector region 11, is conventionally affixed to the base portion 2 of the header 1. Three of the wires 5 are connected to the respective base 9, emitter 10 and collector 11 portions.

A metal cap 12 is then snugly fit around the wall portion 3 of the header 1 and resistance welded at 13 to the header flange 4. The cap 12 may be made of any appropriate metal or alloy, but it is preferred to use the copper base alloy used in the glass-to-metal seal. The remaining wire 5 may be grounded to the metal cap 12.

While the glass-to-metal sealing system has been shown as applied to the specific configuration of FIGS. 1 and 2, it is applicable to any type of package where a hermetic or other type of glass-to-metal seal is desired. As will be demonstrated hereinafter, the seal preferably should be designed such that the net residual stresses in the glass after manufacture are compressive in nature rather than tensile in nature. The configuration of FIGS. 1 and 2 is a typical design for a compressive type glass-to-metal seal. Because the metal header seeks to shrink more upon cooling than the glass due to the difference of coefficients of thermal expansion, the resulting net residual stresses of the glass after the seal has been fabricated are compressive in nature.

In general, glasses or ceramics possess rather high strengths in compression and, therefore, are able to withstand high residual compressive stresses. The metal itself is ductile and in the event that the tensile stresses generated in the metal as it compresses the glass exceed its yield strength or tensile strength, it will yield reducing the net stresses.

To demonstrate the effectiveness of the glass and ceramic-to-metal composites or seals of this invention a series of experiments were run as follows.

Materials Selected for Glass-Metal Sealing

Three glasses were selected to give a range of thermal expansion coefficients from $41 \times 10^{-7}$ /°C to $117 \times 10^{-7}$ /°C. These glasses are all commercially available and are in current use for making glass-metal seals. The properties of the glasses are given in Table II together with the relevant manufacturer's information.

TABLE II

| Glass Type | Coefficient of Expansion in/in/°C | Sealing Temperature | Compatible Material | Subsequent treatment |
|---|---|---|---|---|
| Owens-Illinois 00130 | $41 \times 10^{-7}$ | 615°C | Rodar | None necessary but stress relieve if required |
| Owens-Illinois 00583 | $117 \times 10^{-7}$ | 365°C | Nickel | None necessary but stress relieve if required |
| G.E. ReX | $90 \times 10^{-7}$ | >500°C | None Stated | Recrystallization |

Alloy 638 was selected as exemplary of the alloys useful with this invention and was used in a variety of conditions as described in Tables III through V. These conditions included "as received", abraded and preoxidized. The oxide film on the metal surface was developed in both a wet reducing atmosphere (alumina film only) and in air (alumina overlain with copper oxides).

Seal Types

Figure 3:
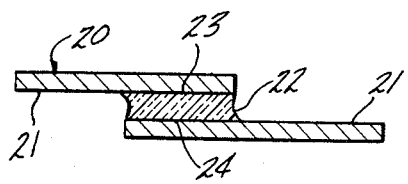
FIG. 3 is a side view of a typical lap-type glass or ceramic-to-metal seal.
Figure 4:
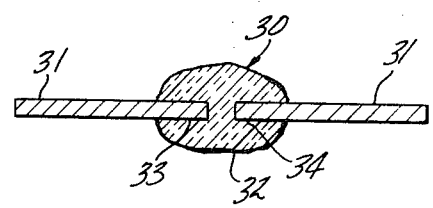
FIG. 4 is a cross section of a typical butt-type glass or ceramic-to-metal seal.

In order to gather the maximum amount of information, two types of seals were made and tested. These included lap and wire butt seals. The lap seal 20 is illustrated in FIG. 3 and comprises two strips of metal 21 with a glass or ceramic 22 sandwiched between the overlapped surfaces. This arrangement has glass-to-metal bonds at interfaces 23 and 24. The butt-type seal 30 is illustrated in FIG. 4 and comprises two metal wires 31 which are aligned along their longitudinal axes and bonded together by a mass of glass or ceramic 32 with glass-to-metal bonds forming at interfaces 33 and 34.

Lap joints were used so that a good indication of the relative wettabilities of the various glasses on the metal could be obtained by estimating visually the contact angle between the glass and metal. Wettabilities can vary from poor (high contact angle with poor flow characteristics) to excellent (low contact angle with good flow characteristics). In general, it would be expected that the seal strength would increase as the wettability increased.

The wire butt type seal can be considered to be more truly representative of an encapsulation seal where the metal leads are enclosed in the glass. Very little information concerning wettability can be obtained with this type of seal. However, differences in thermal expansion coefficient can show up as significant differences in fracture stress values.

Lap Seals

Strip material of about .030 inch gauge at both one-half inch and one-fourth inch wide was used in making lap seals. The two different strip widths were compared in order to determine whether the effect of differences in expansion coefficient would be less marked in the narrower seals. After the appropriate metal preheat-treatment the glass of interest was heated in air in contact with the metal. The glass was applied over about one-half inch of the end of each half of the lap as a finely divided powder. After the glass had become fluid and has wet the surface of the metal, the ends of the lap were aligned, pressed together and the joint allowed to cool.

Several different cooling methods were employed, especially in seals where the differences in expansion coefficients between glass and metal were high. A slow air cool was employed in many cases which involved slowly withdrawing the metal from the heat source over about 15 minutes. Hotplate cools were also used in an attempt to stress relieve the joint at an intermediate temperature before cooling to ambient. The hotplate was at a temperature of about 150°C and after sealing glass and metal, the joint was held at this temperature for 15 minutes.

Each of the glasses used also could be given some kind of a heat treatment subsequent to making a seal in order to partially stress relieve or recrystallize the glass. These treatments were carried out according to manufacturer's recommendations and are described below.

Package Sealant 00583

The finished seal was heated for 30 minutes at 365°C. This treatment ensured good reheat properties to 450°C.

Package Sealant 00130

The finished seal was heated at 615°C for 45 minutes. This treatment ensured good reheat properties to 550°C.

General Electric ReX Glass

The recrystallization treatment for the General Electric ReX Glass was carried out as follows: The glass was heated at 590°C and held for two hours. The temperature was then raised over two hours to 830°C and held for four hours. The temperature was then dropped to ambient at 80°C per hour. This treatment produced a "milky white" glass which was completely recrystallized and had the desired electrical properties. Butt Seals:

The butt seal was made by aligning two straight pieces of wire together and surrounding the ends of the wires with a glass bead as shown in FIG. 4. Particular care was taken, however, to ensure good alignment of the wires. The fracture strength of these seals were measured in a similar manner to those measured for lap seals.

The fracture stresses and wettabilities are given in Tables III through V.

TABLE III.—HIGH EXPANSION PACKAGE SEALANT 00583

Expansion Coefficient 117×10⁻⁷ in./in./° C.

| Description | Expan. coeff. in./in./° C. | Type of seal | Cooling | Fracture stress, p.s.i. | Where fracture | Wetting | Subsequent heat treat |
|---|---|---|---|---|---|---|---|
| Alloy 638 | 170×10⁻⁷ | | | | | | |
| As-rec'd sheet | | Lap | Air | 220 | Glass | Excellent | None. |
| Abraded sheet | | Lap | Air | 720 | do | do | Do. |
| 40 A. film sheet | | Lap | Air | 625 | do | do | Do. |
| 200 A. film sheet | | Lap | Air | 250 | do | do | Do. |
| As-rec'd wire | | Butt | Air | 370 | do | do | Do. |
| Do | | do | Furnace | 180 | do | do | 30 mins. 365° C. |

Note.—Difference in thermal expansion coefficient between alloy 638 and glass 53×10⁻⁷ in./in./° C.

TABLE IV.—REX GLASS

Expansion Coefficient $90 \times 10^{-7}$ in./in./° C.

| Description | Expan. Coeff. in./in./° C. | Type of seal | Cooling | Fracture stress, p.s.i. | Where fracture | Wetting | Subsequent heat treat |
|---|---|---|---|---|---|---|---|
| Alloy 638 | $170 \times 10^{-7}$ | | | | | | |
| As-rec'd sheet | | Lap | Air | 0 | Glass | Excellent | None. |
| Do | | Lap | Air | 0 | do | do | Do. |
| Abraded sheet | | Lap | Slow air | 0 | do | Good | Do. |
| Do | | Lap | Hotplate | 0 | do | do | Do. |
| Pre-oxidized sheet in flame | | Lap | Slow air | 0 | do | do | Do. |
| 40 A. film | | Lap | do | 0 | do | Excellent | Do. |
| Do | | Lap | do | 0 | do | do | Do. |
| 200 A. film | | Lap | Air | 0 | do | do | Do. |
| Do | | Lap | Slow air | 0 | do | do | Do. |
| Wire as-rec'd | | Butt | do | 300 | Interface and glass | Good | Do. |
| Do | | do | do | 170 | Glass | do | Do. |
| Do | | do | do | 122 | do | do | Do. |
| Do | | do | Furnace | 264 | do | do | Recrystallized. |
| Abraded wire | | do | Slow air | 320 | Interface | Excellent | None. |
| Do | | do | Air | 170 | Glass | Good | Do. |
| Pre-oxidized wire in flame | | do | Slow air | 270 | Interface and glass | Excellent | Do. |

NOTE.—Difference in thermal expansion coefficient between alloy 638 and glass $80 \times 10^{-7}$ in./in./° C.

TABLE V.—LOW EXPANSION PACKAGE SEALANT 00130

Expansion Coefficient $41 \times 10^{-7}$ in./in./° C.

| Description | Expan. coeff. in./in./° C. | Type of seal | Cooling | Fracture stress, p.s.i. | Where fracture | Wetting | Subsequent heat treat |
|---|---|---|---|---|---|---|---|
| Alloy 638 | $170 \times 10^{-7}$ | | | | | | |
| As-rec'd sheet and all treatments | | Lap | Air | 0 | Interface and glass | Excellent | None. |
| As-rec'd wire and all treatments | | Butt | Air | 0 | Interface | Fair | Do. |

NOTE.—Difference in thermal expansion coefficient between alloy 638 and glass $129 \times 10^{-7}$ in./in./° C.

The fracture stress values (average of three specimens) quoted in psi have been corrected for area. Past experience has shown that glass-metal seal fracture stresses are in general not very reproducible, especially since the majority of good seals fail in the glass and many of these at low stress values. This is easily understood on the grounds that if significant contraction stresses are induced in the glass on cooling, very little additional external load will be required in order to exceed the tensile strength of the glass. The internal stresses present in glasses are invariably anisotropic in nature especially in amorphous glasses. The stress anisotropy considerably affects the resultant tensile strength of the glass. Seals that fail in the glass would, therefore, be expected to have variable fracture stress values. It is not possible in a glass-to-metal seal to completely stress relieve the joint even if the expansion coefficients of metal and glass are closely matched. Therefore, none of the fracture stress values quoted in Tables III through V are absolute bond strengths nor can they be related to absolute bond strengths. They are, however, representative of actual seal strengths made under the stated specific conditions.

No significant differences in fracture stress were observed between one-fourth inch and one-half inch wide specimens indicating that the geometry of the sample is unimportant to this type of seal.

The lap joint was found to be extremely susceptible to thermal stresses during cooling when large differences in thermal expansion coefficient are involved. Seals that fractured in the glass indicated that the tensile strength of the glass was less than the glass-metal bond strength.

The results indicate several trends. The difference in thermal expansion coefficient between the glass and metal appears to be of significant importance. Moreover, wettability appears to be a necessary factor in making a successful seal.

In most seals made the glass wet the metal extremely well. Any copper oxides formed in making the seal dissolved in the glass and did not appear to affect the bond strength. Surface treatment and the presence of a preinduced alumina film did not significantly affect the bond. However, with the lower expansion glasses, fracture stress values could not be obtained for lap seals owing to the presence of high net residual tensile stresses in the glass which caused fracture in the glass during cooling.

It is evident from Tables III through V that lap seals are highly sensitive to thermal expansion coefficient mismatch. The fracture stress values indicate that a good lap seal can be made with Alloy 638 provided that stresses developed during seal fabrication are not sufficient to cause failure in the glass.

The sensitivity of glass-Alloy 638 lap seals to thermal expansion coefficient mismatch is easily explainable since in all systems investigated, the metal had a much high expansion coefficient than the glass and net tensile stresses developed on cooling. However, since the oxide layer is extremely thin and tightly adherent to the metal, failure almost always occurs in the glass and not in the oxide layer at the glass-metal interface. Therefore, it is evident that Alloy 638 forms a strong bond with the glasses investigated, and failure of the seal is due to failure of the glass and not the bond.

As previously mentioned, surface treatment did not significantly affect the bond provided the metal was free from organic material.

Butt seals could be made successfully between Alloy 638 and the higher expansivity glasses. It is evident from Tables III through V that butt seals made with Alloy 638 are less sensitive to thermal expansion coefficient mismatch. The seals can tolerate a great degree of mismatch. At any particular mismatch value, the fracture stress of a glass-Alloy 638 butt seal is much higher than for the lap seal. This is because the stresses developed in the glass on making a butt seal with Alloy 638 are mainly compressive whereas they are mainly tensile in the lap seal.

Alloy 638 seals were found to be insensitive to subsequent stress relief or recrystallization treatment; very little difference in fracture stress values being observed in most cases.

The data in Tables III through V clearly demonstrate that Alloy 638 which is typical of the alloys useful in the glass-to-metal seals of this invention bonds strongly to all of the glasses investigated. In every case, the strength of the glass-to-metal bond was stronger than tensile strength of the glass. It has also been shown that the glass-to-metal seals in accordance with this invention can tolerate a high degree of thermal expansion coefficient mismatch without failure especially if the resulting net residual stresses in the glass are compressive in nature. However, if the net residual stresses in the glass are tensile in nature, the amount of mismatch tolerance is determined by the tensile strength of the glass.

It has been found that where the net residual stresses in the glass are tensile in nature, the mismatch in thermal expansion coefficient between the metal and glass should preferably be less than $75 \times 10^{-7}$ in./in./°C and still more preferably, be less than $60 \times 10^{-7}$ in./in./°C. However, greater degrees of mismatch can be tolerated with stronger glasses. It has been found that where the net residual stresses in glass are compressive in nature, the mismatch in thermal expansion coefficient between the metal and glass can be as high as $110 \times 10^{-7}$ in./in./°C though preferably, it should be no greater than $80 \times 10^{-7}$ in./in./°C. However, even greater degrees of mismatch can be tolerated if stronger glasses are employed.

The data in Tables III through V also establish that the wettability of the alloys used in the seals of this invention is usually excellent provided the surface is free from organic contaminents. Further, the glass-to-metal seals in accordance with this invention are insensitive to subsequent heat treatment and, therefore, glasses requiring stress relief or recrystallization can be used.

Tests similar to those described above for Alloy 638 glass-to-metal seals, when carried out using plain copper which had not been borated, did not yield viable seals. In general, the glasses did not wet copper very well and did not bond well to the copper. Any bonds which were obtained appeared to be mechanical in nature and all fractures occurred at the glass-to-metal interface.

In summary then, in accordance with the instant invention, a group of specific copper base alloys has been found to yield glass-to-metal seals having markedly improved bond strengths between the glass and the metal. The metal has substantially higher thermal and electrical conductivities and is less expensive than the materials commonly used by the prior art. It is certainly surprising that glass-to-metal seals can be fabricated in accordance with this invention wherein there is a substantial mismatch between the glass or ceramic and the metal. This is especially the case since it is known in the art that the glasses or ceramics do not seal well to plain copper and normally a borating step is required to form any type of a seal. In accordance with this invention a borating step is not employed.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. In a glass or ceramic-to-metal seal comprising a cup shaped metal header, said header having a base portion with a plurality of apertures therein, a wall portion integrally connected to said base portion and a flange portion integrally connected to said wall portion; a plurality of metal wires extending through said apertures in said base portion of said header; a glass or ceramic at least partially filling the cup shaped header and being hermetically bonded to said wires and to said header, the improvement wherein said metal header is a copper base alloy containing 2 to 10 percent aluminum and the balance essentially copper.

2. In a glass or ceramic-to-metal seal as in claim 1, the further improvement wherein the copper base alloy comprises 2 to 10 percent aluminum, 0.001 to 3 percent silicon and a grain refining element selected from the group consisting of iron up to 4.5 percent, chromium up to 1 percent, zirconium up to 0.5 percent, cobalt up to 1 percent and mixtures thereof, and the balance essentially copper.

3. In a glass or ceramic-to-metal seal as in claim 2, the further improvement wherein the copper base alloy consists essentially of 2.5 to 3.1 percent aluminum, 1.5 to 2.1 percent silicon, 0.25 to 0.55 percent cobalt, and the balance essentially copper.

4. In a glass or ceramic-to-metal seal as in claim 3, the further improvement wherein the residual stresses in said glass or ceramic are compressive in nature and wherein the mismatch in coefficient of thermal expansion between the glass or ceramic and the copper base alloy is less than $110 \times 10^{-7}$ in./in./°C.

5. In a glass or ceramic-to-metal seal as in claim 3, the further improvement wherein both said metal header and said metal wire are formed of an alloy containing 2 to 10 percent aluminum, the balance essentially copper.

6. In a glass or ceramic-to-metal seal as in claim 5, the further improvement wherein the copper base alloy comprises 2 to 10 percent aluminum, 0.001 to 3 percent silicon and a grain refining element selected from the group consisting of iron up to 4.5 percent, chromium up to 1percent, zirconium up to 0.5 percent, cobalt up to 1 percent and mixtures thereof, and the balance essentially copper.

7. In a glass or ceramic-to-metal seal as in claim 6, the further improvement wherein the copper base alloy consists essentially of 2.5 to 3.1 percent aluminum, 1.5 to 2.1 percent silicon, 0.25 to 0.55 percent cobalt and the balance essentially copper.

8. In a glass or ceramic-to-metal seal as in claim 7, the further improvement wherein a semi-conductor device is secured to the base portion of said metal header and a metal cap is placed over said metal header so as to enclose the semi-conductor.

9. In a glass or ceramic-to-metal seal as in claim 8, the further improvement wherein residual stresses in said glass or ceramic are compressive in nature and wherein the mismatch in coefficient of thermal expansion between the glass or ceramic and the copper base alloy is less than $110 \times 10^{-7}$ in./in./°C.

* * * * *